US006408258B1

United States Patent
Richer (10) Patent No.: US 6,408,258 B1
(45) Date of Patent: Jun. 18, 2002

(54) ENGINE MONITORING DISPLAY FOR MAINTENANCE MANAGEMENT

(75) Inventor: Serge Richer, McMasterville (CA)

(73) Assignee: Pratt & Whitney Canada Corp., Quebec (CA)

( * ) Notice: Subject to any disclaimer, the term of this patent is extended or adjusted under 35 U.S.C. 154(b) by 0 days.

(21) Appl. No.: 09/467,766

(22) Filed: Dec. 20, 1999

(51) Int. Cl.⁷ .......................... G06F 15/20; G01M 19/00
(52) U.S. Cl. ............................ 702/182; 701/29; 701/30
(58) Field of Search ................................ 702/182, 185; 701/29, 30, 31, 320, 301; 714/33, 736; 324/73.1

(56) References Cited

U.S. PATENT DOCUMENTS

| | | | |
|---|---|---|---|
| 4,575,803 A | 3/1986 | Moore | 701/100 |
| 4,787,053 A | 11/1988 | Moore | 701/123 |
| 4,926,342 A | 5/1990 | Hwang et al. | 702/43 |
| 4,933,882 A | 6/1990 | Molnar et al. | 702/33 |
| 4,954,974 A | 9/1990 | Howell, IV et al. | 701/100 |
| 5,018,069 A | 5/1991 | Pettigrew | 701/35 |
| 5,033,010 A | 7/1991 | Lawrence et al. | 701/35 |
| 5,065,349 A | 11/1991 | Thomas | 701/35 |
| 5,111,402 A * | 5/1992 | Brooks et al. | 701/35 |
| 5,552,987 A | 9/1996 | Barger et al. | 701/14 |
| 5,561,610 A | 10/1996 | Schricker et al. | 702/185 |
| 5,737,215 A | 4/1998 | Schricker et al. | 700/29 |
| 5,793,649 A | 8/1998 | Take et al. | 702/113 |
| 6,067,486 A | 5/2000 | Aragones et al. | 701/29 |
| 6,275,767 B1 * | 8/2001 | Delseny et al. | 701/120 |

FOREIGN PATENT DOCUMENTS

| | | |
|---|---|---|
| EP | 407179 | 1/1991 |
| EP | 843244 | 5/1998 |

OTHER PUBLICATIONS

Frenster, J.A. et al: "Improved Flightline Diagnostics Using an Expert Maintenance Tool (XMan II)" Proceedings of the National Aerospace and Electronics Conference. (Naecon), US, New York, IEEE, vol.–, May 21, 1990, pp. 1354–1357.
Document—Maintenix White Paper, Mxl Technologies Ltd., 1997 Brochure—For Aviation Maintenance Management Software, Maintenix, Mxl Technologies Ltd.

* cited by examiner

Primary Examiner—Kamini Shah
(74) Attorney, Agent, or Firm—Bachman & LaPointe, P.C.

(57) ABSTRACT

The present invention is directed to a system and method for aircraft engine monitoring to permit management of individual aircraft in a fleet of aircraft. A processing system collects data on engine operational parameters and then uses this data to perform calculations to accurately determine time remaining until service and relative wear of specific engines in the fleet of aircraft. The time remaining until service and relative wear is displayed on a display screen which is configured to display this data for each engine separately. The displayed results can be used by an aircraft maintenance manager to accurately determine if the aircraft engines are being operated according to a maintenance plan, or to rotate the service of the aircraft to balance the wear on the aircraft engines in the fleet.

19 Claims, 10 Drawing Sheets

| FCF | 1.0 |
|---|---|
| RTCF | 0.5 |
| | t1 = 90 sec<br>t2 = 0 sec<br>x1 = 4 |
| ECF | 2.0 |

| 2 1/2 OEI Thresholds | MGT (deg C) | Ng (%) | QLFLT (%) |
|---|---|---|---|
| 2 1/2 OEI Limits | 885 | 100.4 | 200 |
| min threshold | 720 | 92 | 200 |

FIG. 3

Engine Parameter Thresholds

| | MGT (deg C) | Ng (%) | QLFLT (%) | Nf (%) | MCF | ACF | 1/ACF |
|---|---|---|---|---|---|---|---|
| Threshold 1 | 400 | 70 | 10 | 90 | 0.07 | 50 | 0.02 |
| Threshold 2 | 640 | 86 | 200 | 127 | 0.31 | 20 | 0.05 |
| Threshold 3 | 705 | 90 | 200 | 127 | 0.48 | 15 | 0.07 |
| Threshold 4 | 775 | 94 | 200 | 127 | 0.76 | 10 | 0.10 |
| Threshold 5 | 843 | 97 | 200 | 127 | 1.00 | 6 | 0.17 |
| Threshold 6 | 865 | 98.6 | 200 | 127 | 1.16 | 4 | 0.25 |
| Threshold 7 | 900 | 100 | 200 | 127 | 1.33 | 4 | 0.25 |
| Threshold 8 | | | | | | | |
| Threshold 9 | | | | | | | |
| Threshold 10 | | | | | | | |

ENGINE MONITORING DISPLAY FOR MAINTENANCE MANAGEMENT

TECHNICAL FIELD

The present invention relates to engine component trend monitoring and, in particular, to aircraft and helicopter engine component trend monitoring for maintenance management. The invention further relates to a an engine maintenance monitoring display.

BACKGROUND OF THE INVENTION

It is well known that aircraft turbine engines have to be regularly overhauled and inspected to prevent problems during engine operation. One particular type of inspection, known as Hot Section Inspection (HSI), is typically performed on a turbine engine after a predetermined period of time to assess the wear and tear on specific engine components. Hot section inspections are expensive in terms of the cost of manpower involved, since these inspections typically require that the engine be partially disassembled to view the particular parts under inspection. They are also expensive because they require the particular aircraft involved to be taken out of service. Another type of maintenance that may be required at any time during aircraft service is the replacement of critical components that have a declared life limit. Life limits are typically specified in terms of a maximum number of cycles or hours. Another type of engine maintenance which must be performed on turbine aircraft engines is what is known as Overhauls. Overhauls involve the aircraft and engine being taken out of service so as to permit the inspection, the repair or the replacement of all engine components. This type of maintenance is particularly expensive and can cost as much as 70% of the original cost of the engine, depending on the engine type and exactly what components need to be overhauled. For helicopter engines, most manufacturer maintenance concept requires that the basic time between overhaul (TBO) be performed at about the three-thousand hour service mark. With relevant supporting data and the help of the engine manufacturer, fleet operators can obtain extension from the published basic TBO or adhere to a "on-condition" engine overhaul program.

The problem that arises with most aircraft turbine engines is that the engines are exposed to different levels of wear during their operational service. For example, the helicopter engine may be exposed to higher levels of wear if there are a large number of take-offs and landings during a given mission. During each take-off, the engine must be spooled up to its lift-off rotational velocity and when the helicopter lands, the engine must be spooled back down to a low speed so that the helicopter can loiter on the ground, or the engine is spooled down to shut off. Each one of these take-offs and landings represents a single cycling of the engine, and for an in-service helicopter, there may be several take-offs and landings during a given mission. The greater the number of cycles per mission, the greater the wear on the engine components.

Another element which further adds wear to the engine components is the manner in which the engines are throttled-up and down during each one of these cycles. Pilots often have different styles of flying, due to different weather conditions or personal experience and may sometimes use the throttle controllers in a manner which places higher levels of stress on the engine components than what may be ordinarily expected. For example, a helicopter pilot who is flying on a tight mission schedule, may spool up the engine faster so as to get off the ground sooner. That same pilot may also spool down the engine faster so as to land more quickly, loiter on the ground at a high engine rotational velocity and then quickly spool the engine back up to become airborne again more quickly. Operational usage of the engine under these circumstances places even higher stresses on the engine components than would normally be expected. This reduces the amount of in-service time before the engine components require either a hot section inspection, a critical part replacement, or a complete overhaul.

Since different aircraft fleets are exposed to different levels of operational stress, the actual wear on engines from one fleet to another may vary considerably. Likewise, different aircraft within a fleet may be subjected to different levels of operational stress, and the actual wear on engines from one aircraft to another may vary considerably.

Aircraft engine maintenance is a significant cost in operating any aircraft-based service. Poor financial planning for the costs of inspections, part replacements, engine overhauls, etc., cannot be tolerated. Various maintenance plans have therefore evolved in the aircraft maintenance industry to provide aircraft-based service operators with a schedule of fixed costs for engine maintenance over a period of a number of years. Since engine maintenance plans, e.g. a guaranteed financial protection plan (GFPP), are standardized, some aircraft fleets with lesser degrees of actual wear may require maintenance too soon, while other fleets with greater degrees of wear may require maintenance sooner than anticipated.

The standardization of aircraft engine maintenance is based on a rough, although sometimes sophisticated, estimate of expected engine component and aircraft usage in a fleet for the period of time of the maintenance plan. In the case of an established operation, the plan can thus be based on a prediction of engine component wear and usage by analyzing the history of engine usage and/or aircraft usage as well as the particular maintenance requirements of the engines. Flight log books can be analyzed to determine factors such as altitudes reached, fuel consumption, the number of engine cycles (i.e. take-offs and landings, as well as engine spooling downs), and hours in flight. In the case of a new operation or a new engine, the standardization of the maintenance plan can even be more difficult and thus it may have a larger margin of error. As a result, it becomes a difficult task for an engine maintenance service provider to determine whether a rate for maintenance plan is being fairly applied to each of its customers. It also becomes a difficult task for maintenance managers of aircraft fleets to determine if the engines in the fleet are being flown in proper compliance with a maintenance plan. Furthermore, it becomes a difficult task for aircraft maintenance managers to accurately predict and optimize the dates for shop visits or predict the costs inherent with shop visits.

The net result of following such a maintenance plan according to the prior art is that aircraft-based service operators who use and operate their aircraft with care and under favorable conditions actually pay more than they should. Thus there is no incentive in the maintenance plan to manage the operation of an aircraft or fleet to reduce or control engine component usage.

SUMMARY OF THE INVENTION

Accordingly, it is an object of the present invention to provide a method for monitoring engine usage, and determine time remaining until hot section inspections, critical component replacements, and engine overhauls. According a first broad aspect of the invention, this object is provided by a display which allows for a comparative indication of engine component usage relative to maximum recommended usage.

It is another object of the invention to provide a method for monitoring engine usage to predict shop visit dates and maintenance plan costs.

It is another object of the present invention to provide a method for monitoring engine usage to determine a suggestion as to better use of an aircraft or particular aircraft within a fleet of aircraft to control engine wear on aircraft having higher levels of wear.

It is a further object of the present invention to provide a method for monitoring engine usage to determine compliance with an engine maintenance plan, and to produce reports pertaining to engine maintenance plan compliance.

According to a first aspect of the invention, there is provided a method of monitoring operation of at least one engine comprising establishing a time schedule of planned maintenance activities for the engine based on an expected use of the engine, monitoring operational parameters for the engine during use, analyzing the operational parameters to predict when the planned maintenance activities should be performed, providing an indication of whether a usage of the engine necessitates maintenance ahead of schedule. The maintenance plan schedule can be based on the most probable scenario under the conditions of proposed use of the engine. By providing an indication as to whether the actual operation of the engine over time is compliant with the maintenance plan, the engine operator can manage engine operation accordingly. The aircraft or fleet profile information used to prepare a maintenance plan may include the geographical location of the operation of the aircraft engine, the flying hours per year, the length of flights, the desired time between overhauls (TBO) and the time between hot section inspections (HSI) requested by the aircraft operator, as well as information on the operator's background or history if available. The intended aspects to be included in the maintenance plan are the following scheduled event: overhaul (O/H); hot section inspection (HSI); low cycle fatigue (LCF), namely the replacement of parts after normal service life; and basic unplanned removal (BUR) of parts that require replacement before their normal service life (these events are not fixed in time, but based on probability of the events occurring, the cost is factored into the maintenance plan).

Preferably, the method further comprises steps of setting a schedule of charges corresponding to the time schedule of planned maintenance activities, and of adjusting, if necessary, the schedule of charges if the usage of the engine necessitates maintenance ahead of schedule. Maintenance can take the form of inspections, cleanings, part conditionings and part replacements. Preferably, the indication of whether the usage of the engine necessitates maintenance ahead of schedule comprises providing an indication of the predicted date and the planned date for the maintenance activity.

According to the above objects, the invention provides a method for accurately calculating a time remaining until service of an engine component, comprising the steps of:
(i) recording operational parameters including hours in use, and including at least one of temperature and rotational speed for said engine component;
(ii) analyzing said operational parameters recorded;
(iii) determining an engine usage value and an engine usage rate value for said component based on said analyzing; and
(iv) comparing said engine usage value and said engine usage rate value with reference values to predict a time when service of said engine component will be required.

The operational parameters may be any engine parameters which can be used to determine "wear and tear" on the engine component. Typically, such parameters include at least temperature and rotational speed over time. Torque is also a useful parameter and is used to verify engine performance. In both turbine and piston engines, fuel consumption is an additional useful parameter.

The engine usage value provides an indication of how much of the service life of the engine has been used up. The engine usage rate value may be an average usage per unit time or per unit activitity, such as cycles, missions, trips or distance travelled. The rate may be based on a full history since the beginning of recording, eg. since the last maintenance, or over a more recent shorter time period. The "predicted service time" is generally an indication of the time when servicing is required under a warranty program, or an indication of the number of nominal flights, cycles or missions before the next servicing will be required under warranty.

Preferably, the predicted service time is calculated for a plurality of engine components of an aircraft, and the method further comprises a step of providing a display of the predicted service time for the plurality of engine components including an indication of a maintenance plan service time and a total engine component usage time. In this way, an operator compares predicted service time among engine components with the maintenance plan service time to determine which engine component will require maintenance first, and assesses whether the predicted service time is ahead or behind the maintenance plan service time. The display or printout obtained indicates how much time is left before servicing will be required, as well as information as to whether engine usage is balanced and above or below normal or expected levels. The operator may adjust how the aircraft is used to compensate for any imbalance among engine component usage and may temper engine component usage if it appears excessive. The operator's objective is to make sure that maintenance is performed only when required by the maintenance plan (and not necessarily sooner than need be), and that all engines or engine components fall due for maintenance as close as possible in time.

When maintaining a multi-engine aircraft, certain engines may require maintenance before others, and the goal is to balance engine usage so that all engines require maintenance at the same time. Likewise, if a small fleet is to be brought in for maintenance at the same time, the goal is to balance usage of various aircraft.

According to the above objects, the invention also provides a method for managing usage of an aircraft in a fleet of aircraft, comprising the steps of:
(i) recording operational parameters including hours in use, and including at least one of temperature and rotational speed for each engine of said aircraft;
(ii) analyzing said operational parameters recorded;
(iii) determining an engine usage value and an engine usage rate value for said aircraft based on said step of analyzing;
(iv) comparing said engine usage value and said engine usage rate value with reference values to predict a time when service of said aircraft will be required; and
(v) managing aircraft usage based on said predicted service time.

According to the above objects, the invention also provides a processing system cooperating with a display system, wherein the display system is configured to display the estimated time until service for a plurality of engines simultaneously.

According to the above objects, the invention further provides a method for determining compliance of an engine with an engine warranty, the warranty defining a predetermined level of wear for an engine, comprising the steps of:

(i) counting the cycles per mission for at least one component of the engine;

(ii) weighting the cycles per mission based on wear and usage of the engine;

(iii) averaging the weighted cycles per mission over a total number of missions; and (iv) comparing the average cycles per mission to a predetermined standard cycles per mission, wherein the engine is compliant with the warranty if the average cycles per mission are less than or equal to the predetermined cycles per mission, otherwise, the engine is not compliant with the warranty.

BRIEF DESCRIPTION OF THE DRAWINGS

The invention will be better understood by way of the following description of a preferred embodiment of the invention with reference to the appended drawings, in which.

DETAILED DESCRIPTION OF THE PREFERRED EMBODIMENT

Figure 1A:
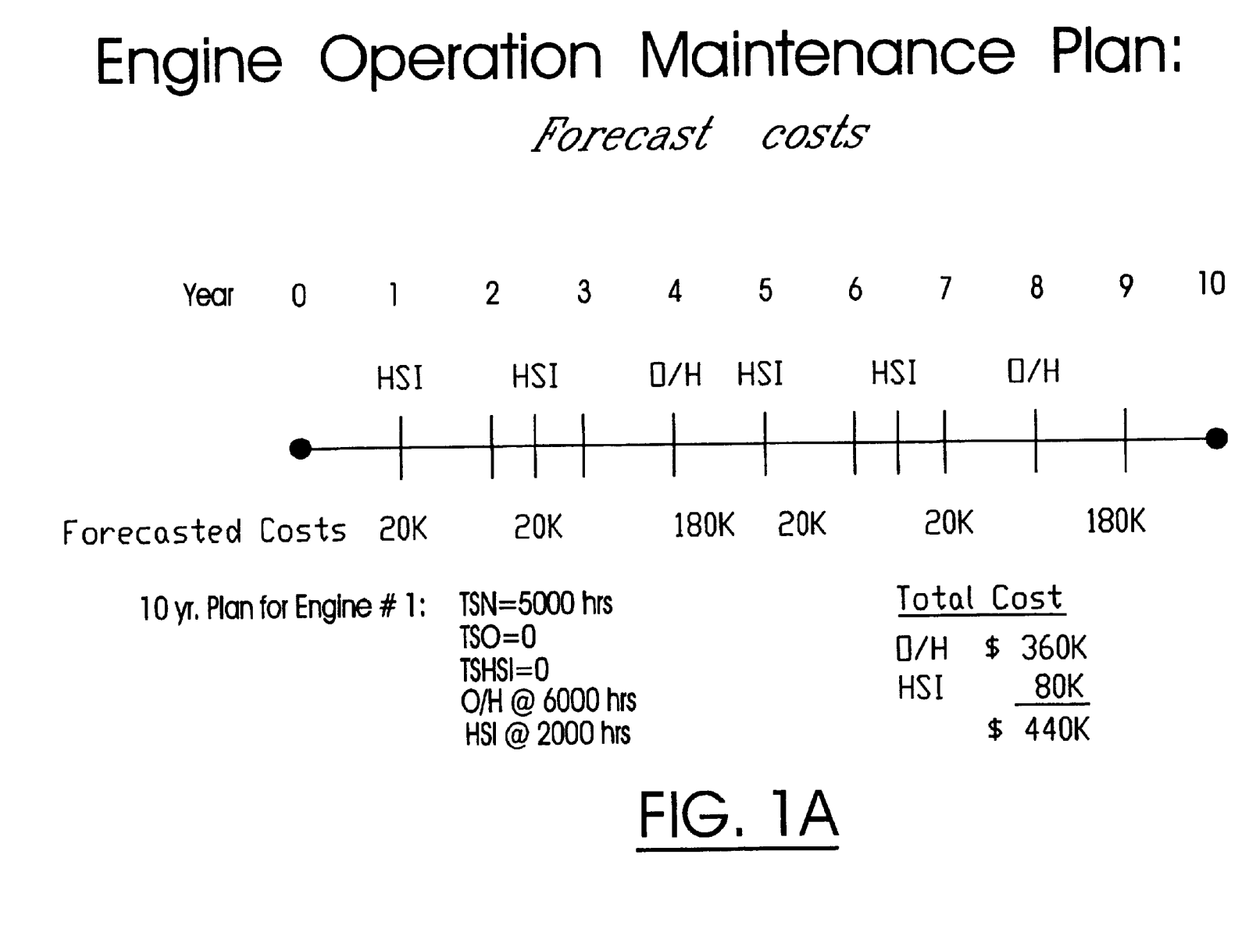
FIG. 1A illustrates a timeline of forecasted costs and maintenance plan events according to a fictitious example.
Figure 1B:
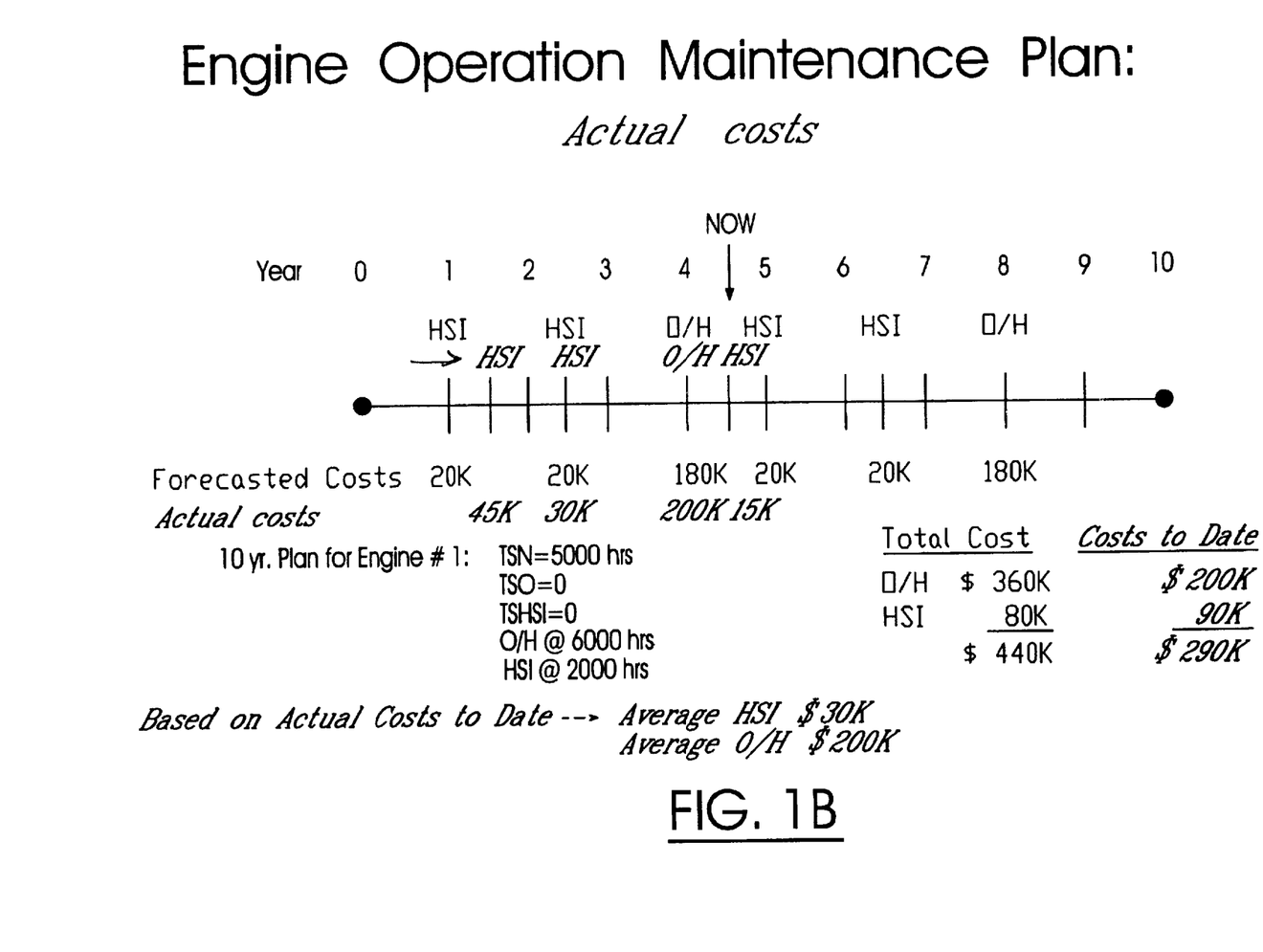
FIG. 1B illustrates a timeline of actual costs and maintenance activities at about 4.5 years into the plan of the fictitious example.
Figure 1C:
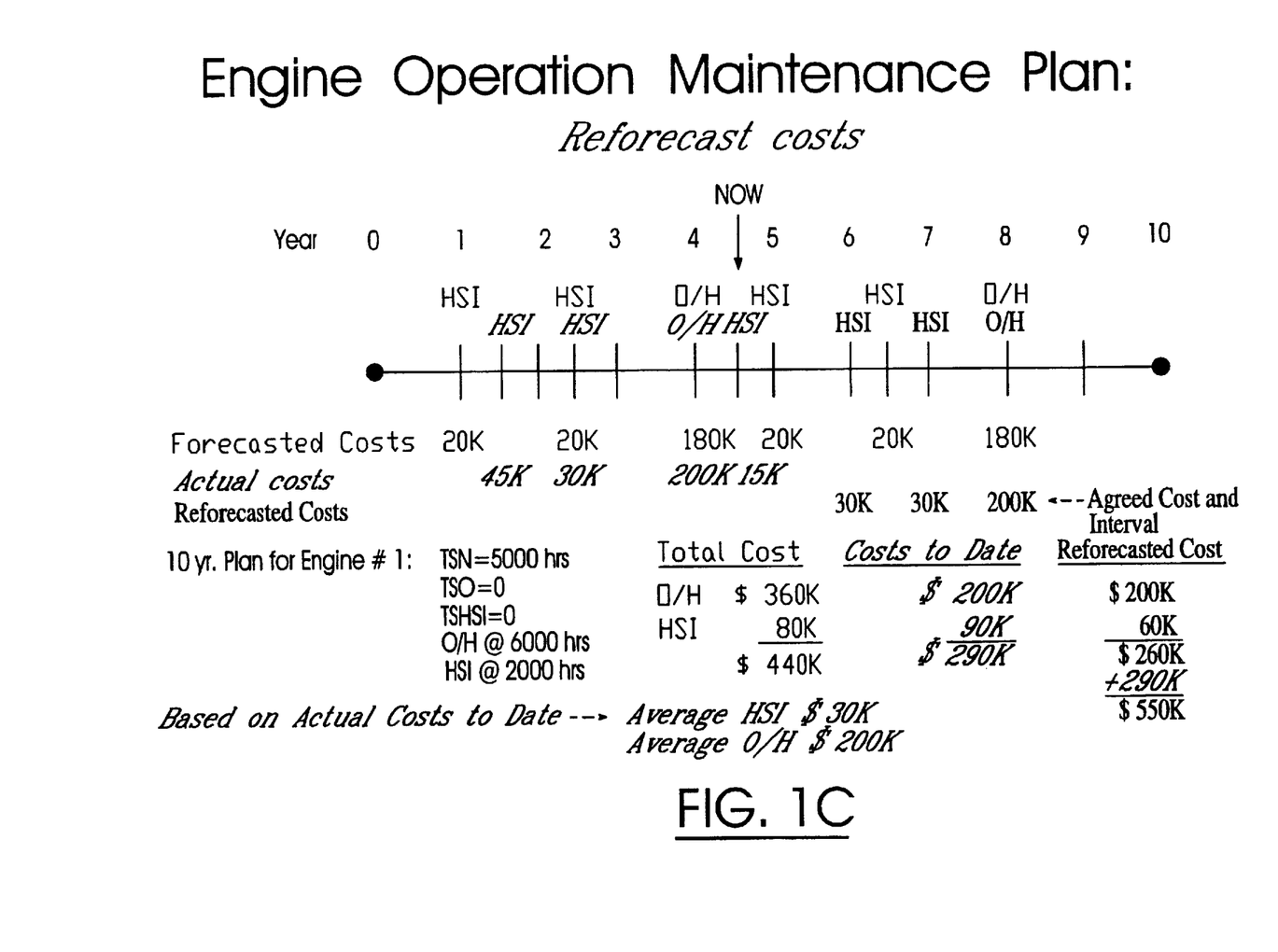
FIG. 1C illustrates a timeline of reforecasted costs and maintenance plan events for a remainder of the ten year maintenance plan according to the fictitious example.

FIGS. 1A to 1C illustrate timelines for an engine operation management costs in the case of a fictitious example of one aircraft. As can be seen, the originally forecasted costs in FIG. 1A are over a ten year period, and include a number of engine hot section inspections (HSI) and overhauls (O/H). The maintenance plan is based on the aircraft (or fleet) profile data. In this case, the operator has requested a 10-year maintenance plan. By analysis of the profile for the aircraft, costs are calculated and maintenance events are planned as shown in FIG. 1A. FIG. 1A indicates the costs and dates for the HSI and O/H events and the costs include BUR's. The figure also indicates the time since new (TSN) value, the initial time since overhaul (TSO), and the initial time since hot section inspection (TSHSI). The actual costs and event times shown in FIG. 1B are different from the originally forecasted costs and event times. In the example, the total originally forecasted cost was to be $440,000. The total cost of maintenance up to 4.75 years has been $290,000, and the reforecasted cost for the remainder of the ten year term shown in FIG. 1C is $260,000, bringing the total cost to $110,000 more than the originally forecasted cost. Such an increase is due, in the example, to heavier than expected use and possibly mismanagement of aircraft operation.

As can be seen, the reforecasted costs under the maintenance plan for the latter 5.25 years of the 10 year term are expected to be $60,000 less than the actual costs for the first 4.75 years. In the example, the amount of service duty of the aircraft is not intended to change, however, by providing the aircraft operator with information about how the engines of the aircraft are being used over time, it is expected that the operator will be able to manage engine use and respect a more cost efficient maintenance plan.

Figure 2:
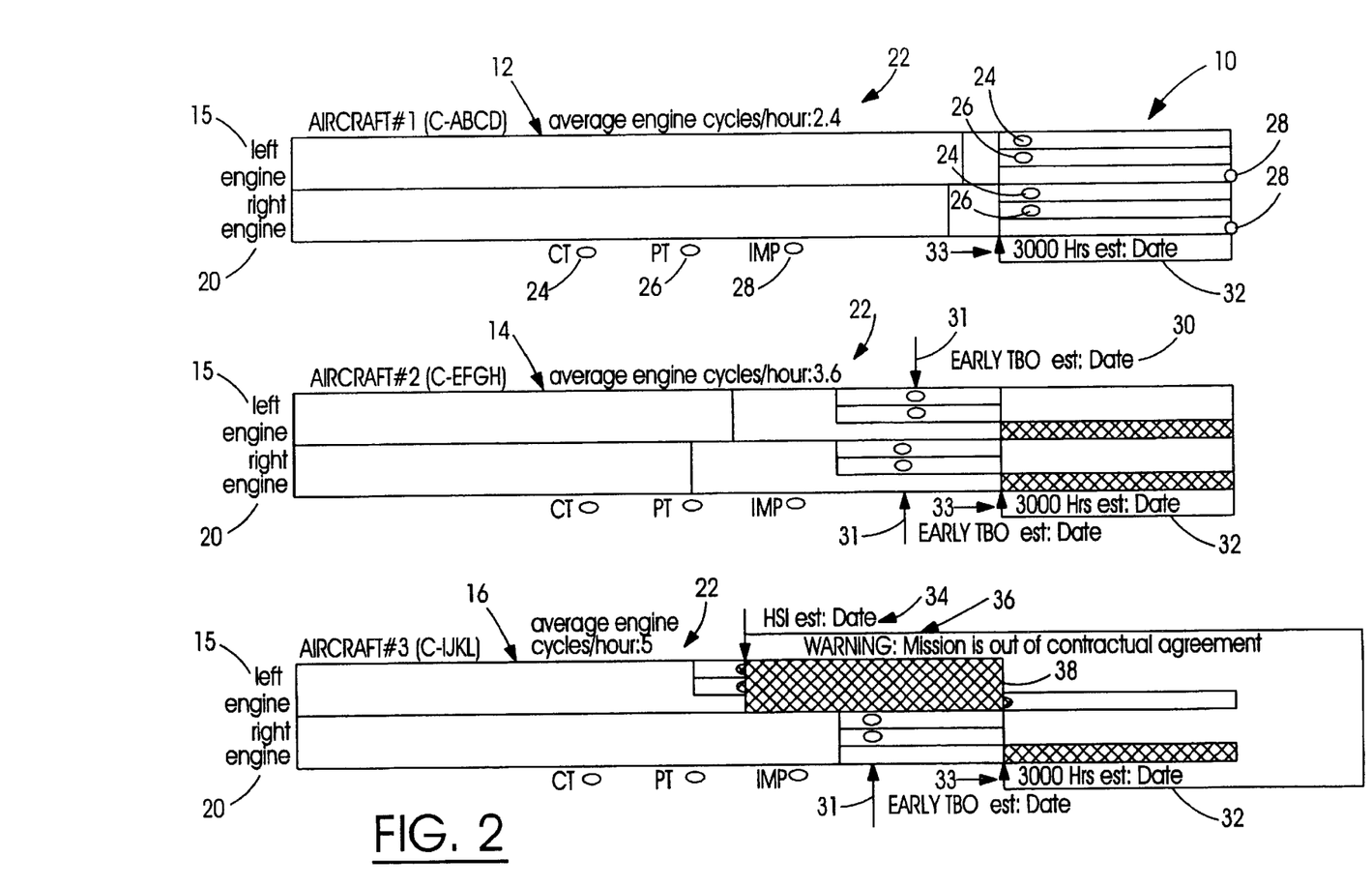
FIG. 2 illustrates a graphical display system for a plurality of aircraft in a fleet which can be used to demonstrate the wear and usage of individual components on individual vehicles within the fleet.

FIG. 2 illustrates a graphical display system which displays the engine component wear for individual components within an engine on a fleet of vehicle engines. The display 10 is composed of three display bars 12, 14 and 16 which display the wear on individual components for three separate aircraft within a fleet. Each of the display bars 12, 14 and 16 are divided in half to provide individual displays for a left engine 15 and a right engine 20. The resulting display thus gives an instant indication of the component status for every engine pair within every aircraft in the fleet. Above each of the display bars 12, 14 and 16, respectively is a display window 22 which displays the current calculated average cycles per hour. The average hours per mission are also weighted in accordance with certain types of engine usage, as will be explained in further detail herein.

Each of the aircraft engines within the fleet of aircraft contains individual life cycle fatigue limited components which require a hot section inspection or an overhaul maintenance. In the preferred embodiment of the present invention, these components are identified as the compressor turbine (CT), power turbine (PT), and an engine impeller (IMP). Each of these individual components are represented on the graphical display by a series of markers 24, 26 and 28. These markers indicate a predicted date for maintenance based on a total number of weighted cycles since last maintenance for each of the engine components and a present average number of cycles per hour for each of the engine components. The marker 24 represents the CT, while the markers 26 and 28 represent the PT and IMP respectively. The markers may be graphically displayed with either different shapes, different colors or different shadings. However, the markers should be visually distinct from each other in order to more clearly distinguish the different components of the engine. Each of the display bars 12, 14 and 16 further display an estimated date at which the three thousand hour time point for component overhaul will occur. Of course, the time point varies from engine to engine, and the display shown is merely an example. The display bars 15, 20 for the left engine and the right engine illustrate a total number of weighted cycles for the engines as a whole for all missions flown since the last HSI. Of course, the total number of weighted cycles are presented on the display bar having a scale of hours after scaling the total number of weighted cycles by the number of cycles planned in 3000 hours.

The date of engine overhaul is illustrated visually by an arrow 33 which points to a vertical line on each of the display bars 12, 14 and 16. The actual date on which the three-thousand hour overhaul will occur is displayed in a window directly below the display bar at 32. A display window 30 is placed above each of the display bars for each engine to display an estimated date for overhaul if such overhaul will be needed earlier than the three-thousand hour in-service date, due to detection of excessive engine usage. In addition to displaying the estimated date for overhaul, the display system also graphically displays arrows 31 which give a visual indication of how close the individual components are to requiring an early replacement.

Display bar 12 shows each of the markers 24, 26 and 28 beginning at the far right portion of each of the displays. As the engine is operated, each of the markers 24, 26 and 28 travel towards the left of the display bar 12 until they reach the arrow and line shown at 33. Due to various changes in the operation of the engine, such as increases in cycles per hour, or sudden throttling and/or deceleration, the display markers may be pushed forward to indicate the need for an early overhaul or hot section inspection. Display bar 14 illustrates an average cycles per hour which is higher than the average cycles per hour for display bar 12. Due to this more stressful operation of the engine, the markers 24 and 26 have moved farther to the left and passed the arrow and line at 33. As a result, these markers are indicating an early overhaul which will be needed for these particular engines. The estimated date at which this overhaul will be required is illustrated in the window 30 and the need for the overhaul is flagged by the arrow 31.

Engine components which have not been stressed to the point of overhaul are highlighted on the display bar 14. Thus, an aircraft maintenance manager reviewing the display bars can readily determine which components are in need of overhaul due to engine usage and stress and which components have not reached the stress level to need replacement.

Display bar 16 illustrates an aircraft in which the average cycles per hour are even higher than the average cycles per hour for the aircraft of display bar 14. The average cycles per hour for this aircraft are 5, whereas the average cycles per hour on display bar 14 were 3.6. The display bar 16 representing this last aircraft illustrates that all of the components for the left engine have been stressed past the overhaul point and warns the maintenance manager via warning 36 that the operation of the aircraft is outside the conditions of the maintenance plan agreement for the engine. The display bar 16 also includes a window 34 which projects the estimated date for a hot section inspection, which may also be needed due to exceptional wear on the engine from sudden accelerations or decelerations.

The display bar 16 also highlights at 38 a problem with the left engine and clearly indicates that the left engine is being operated out of compliance with the maintenance plan. The display bar for the right engine shows the need for an early overhaul but indicates that the engine is still operating within its maintenance plan conditions. Such differences in the usage and wear of the engines often occur because a pilot only starts one engine at a time and will not initiate ignition on the second engine until the first engine is fully spooled up. If a pilot consistently starts and spools up the left engine before starting and spooling up the right engine, the left engine will be exposed to much greater degrees of usage if take off occurs in less than 90 seconds and will require inspection and overhaul much sooner than the right engine. This is the case for the display bar 16 which shows that the left engine has been operated to a degree which is beyond the contractual maintenance plan for engines on that aircraft. However, the right engine for that aircraft has not violated its maintenance plan because the pilot for that aircraft consistently starts that engine only after starting the left engine. As a result, the right engine has not been exposed to the same level of stress and usage as the left engine and is able to stay within the parameters of the maintenance plan.

The graphical display system of FIG. 2 provides a variety of useful information to an aircraft maintenance manager in an "at-a-glance" format. The system displays a remaining time until hot section inspection and overhaul for each engine in the fleet of aircraft. The system also provides a graphical indication of how close each of the engines are to the maintenance actions and whether the engines are being operated in compliance with the prevailing maintenance plan. This allows an aircraft maintenance manager to predict and schedule shop visits, as well as predict and control maintenance costs (i.e. both the costs of taking an aircraft out of service and the cost of the engine maintenance itself). This system also allows an aircraft maintenance manager to determine which vehicle engines are being exposed to excessive wear, and thus permit the aircraft maintenance manager to rotate the aircraft during operations to even the engine usage throughout the fleet. Furthermore, this system produces a certification of compliance or non-compliance with an engine maintenance plan.

As can be seen from the discussion of FIG. 2, the average cycles per hour displayed at 22 are not only affected by the number of take-offs and landings during a mission, but are also affected by specific types of usage which expose the engine to greater degrees of wear. Thus, in order to produce the average cycles per hour 22 displayed on each of the three display bars 13, 14 and 16 respectively, the cycles per hour must be averaged over the number of hours of operation of the engines. First, in order to accurately weight the cycles per mission in a consistent manner, a formula is utilized to perform the weighting process for each of the compressor turbine, power turbine, and impeller. The number of cycles for the aircraft, as used for calculating the cycles per hour value, can either be obtained using the engine component weighted cycles per mission value, or by direct calculation based on the engine operation parameters monitored. Typically, if one engine is determined to have a greater number of cycles in a mission, the calculation for the average cycles per hour for the aircraft is based on the greater value from the plurality of engines. The basic formula according to the preferred embodiment for calculating cycles per mission for the engine as a whole, compressor turbine, power turbine and impeller are defined by:

$$\text{Cycles}=(\text{FCF}\times[(\text{MCF}+\Sigma 1/\text{ACF})+(\#2\tfrac{1}{2}\text{OEI}\times\text{ECF})+\text{RTCF}]) \quad (1)$$

and are used for determining the weighted cycles per hour for the individual components in an individual engine.

Figure 3:
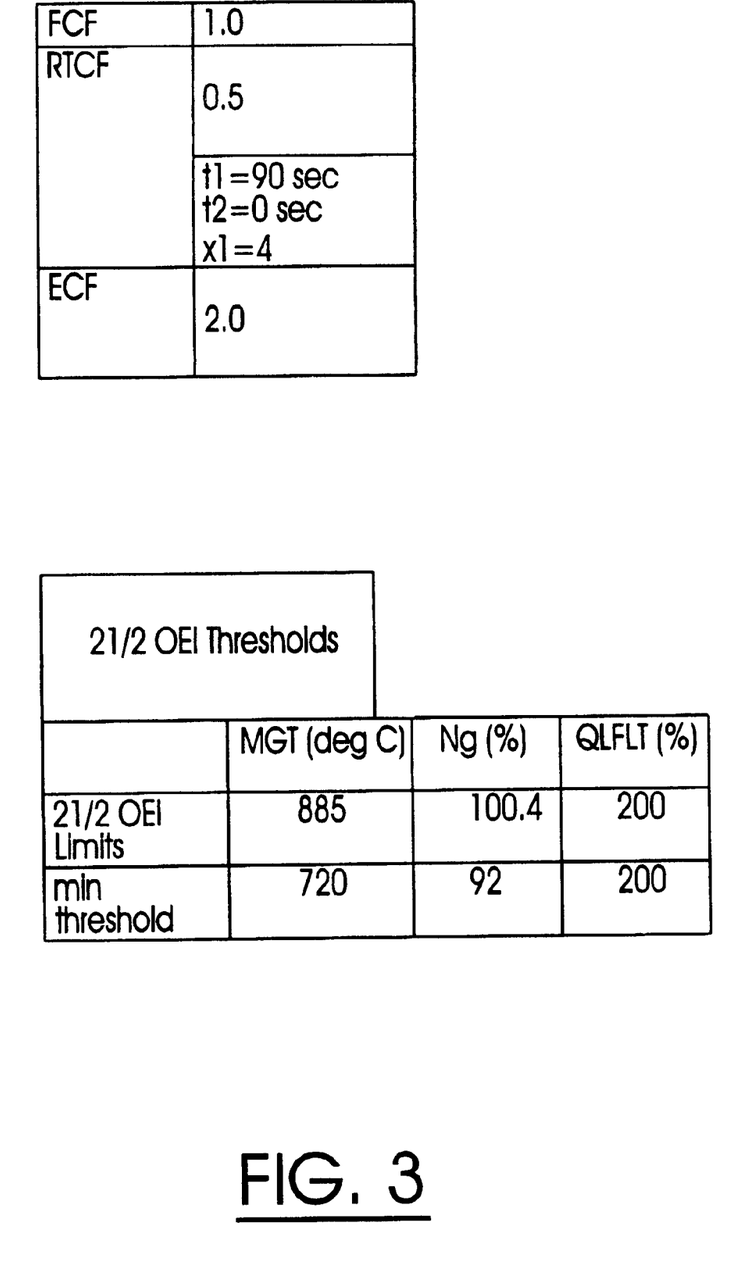
FIG. 3 illustrates tables which determine various parameters for calculating weighted cycles per mission for critical components in one particular type of helicopter engine.

FCF is the flight cycle factor, which is defined in the first table of FIG. 3. FCF is normally defined by the value of 1.0 signifying one cycle per mission. The remaining portion of formula (1) defines a factor which either reduces or increases the FCF, depending on the particular engine application.

Figure 3A:
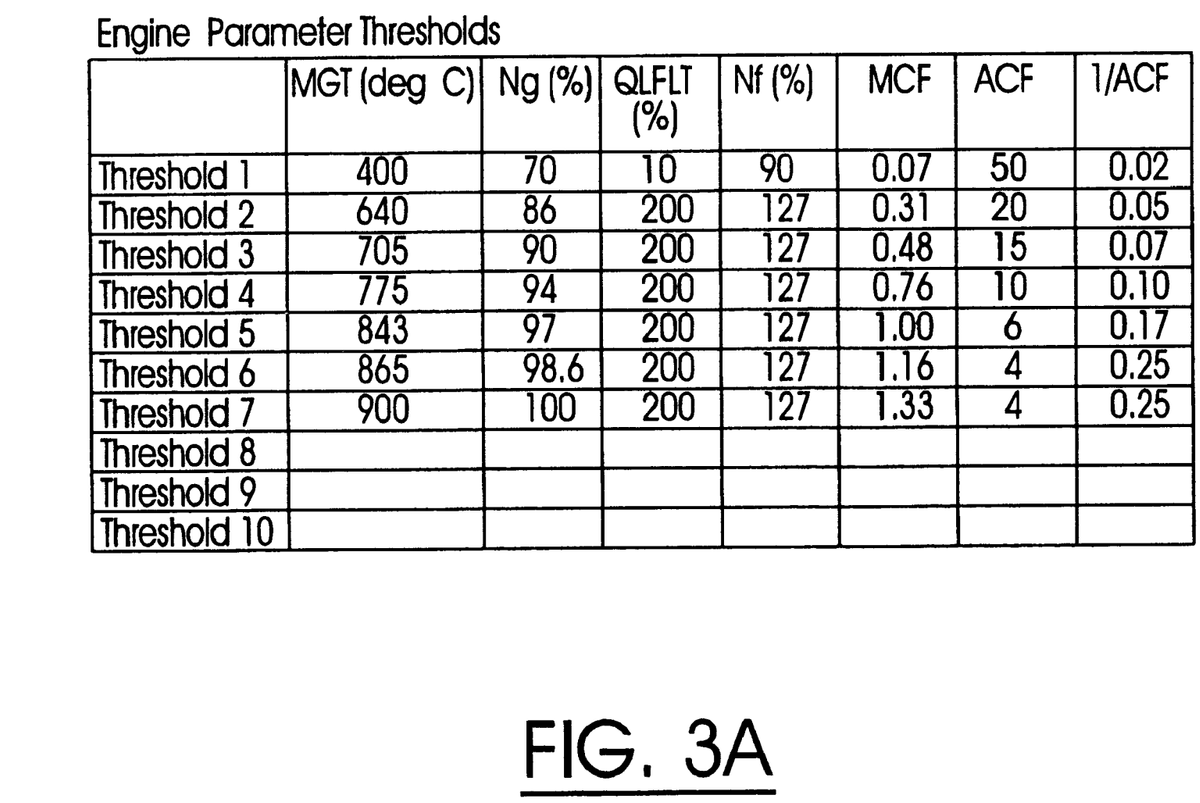
FIG. 3A illustrates tables which are used to determine various parameters in calculating weighted cycles per mission for a particular type of helicopter engine.

MCF signifies the major cycle factor for the highest threshold crossed during a flight for this particular factor. The MCF factors are different for the engine as a whole and for each of the three major engine components for which the cycles per hour value is calculated, and the MCF factors are illustrated for each of the three major engine components in FIG. 3A. The MCFCT factors are interpolated along seven thresholds as shown in FIG. 3A. The MCFCT values vary from 0.07 to 1.33. For MCFPT, the values range between 0.20 and 1.70. For MCFIMP, the values range between 0.02 and 1.54. The MCF values which can be used in the formula (1) for weighting the cycles per hour can be determined by the Electronic Engine Control system of the engine (EEC) in a number of different ways. The EEC can use the look-up table of FIG. 3A and compare the measured gas temperature (MGT) adjacent the particular component and use this value to correlate the value for MCF. For example, when the MGT in the vicinity of the CT disk reaches a maximum threshold of 843° C., the EEC will assign the MCF value of 1.00, and apply this value to equation (1). If the MGT value in the vicinity of the CT disk reaches a threshold of 900° C., the value assigned for MCF in equation (1) will be 1.33. Other measurable parameters which can be used for determining the value for MCF are: the ratio of maximum rotational velocity for the gas turbine during a mission versus the maximum design rotational velocity for the gas turbines (Ng); the ratio of maximum noise filtered torque value versus maximum design noise filtered torque valve (QLFLT); and the ratio of maximum free turbine rotational velocity versus maximum design rotational velocity for the free turbine. The EEC can use one of these four variables to determine the value for MCF, or use combinations of these four variables to assure that the MCF value selected is accurate.

The value for abbreviated cycle factor (ACF) is defined by the tables shown in FIG. 3A. The ACF is initiated by an engine low power excursion when not preceeded by an engine start and is given a factor value corresponding to the maximum threshold reached until a new low power excursion or engine shut-down is detected. If the threshold of one is not reached during the engine cycle, the ACF is given a factor of infinity (i.e. the largest value which the computer can use), causing the inverse of ACF to be equal to zero or negligible. Therefore, the summation of inverse ACF values becomes the sum of all ACF values for all thresholds crossed during the flight, except for the values of ACF corresponding to the highest threshold crossed. The EEC calculates a summation of the inverse ACF values as they cross each of the thresholds defined in the tables of FIG. 3A. For ACFCT, the inverse ACFCT values range between 0.02 and 0.25. For ACFPT, the inverse values range between 0.02 and 0.025. For ACFIMP the inverse values range between 0.02 and 0.33.

Figure 7:
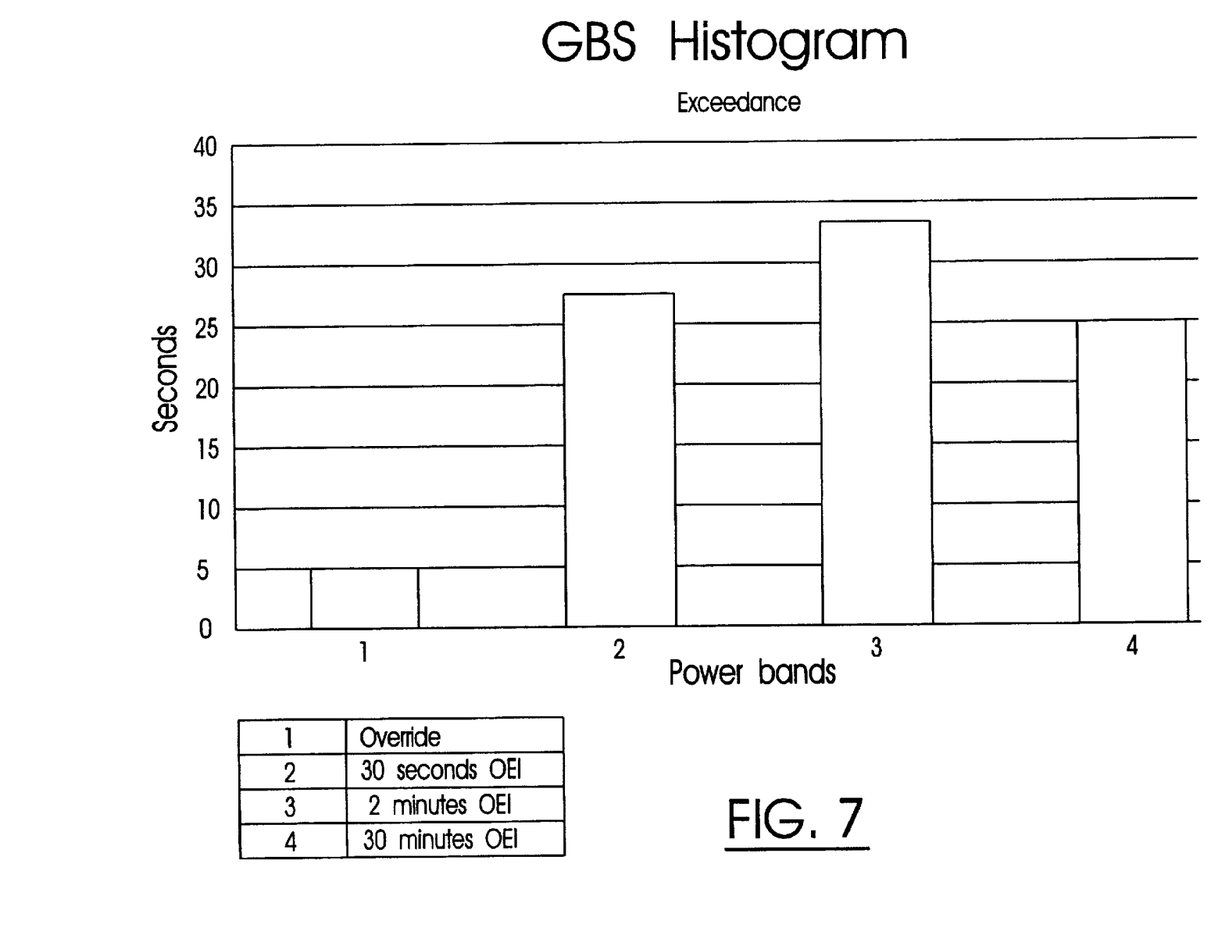
FIG. 7 provides a graphical view of how exceedances are recorded for certain aircraft.

The variable #2½ OEI indicates the total number of 2½ minute one-engine inoperative conditions which occur during a mission. An excursion into 2½ OEI occurs when one of the 2½ limit thresholds, defined in FIG. 3 is exceeded during a 2½ OEI condition. Subsequent 2½ OEI excursions are considered only if all of the ½ OEI minimum thresholds have been reached. This will eliminate excessive cycle counts when the engine operates near the 2½ OEI rating. The variables Override (i.e. a pilot initiated override or the aircraft warning system indicating that too much power is being requested of an engine), 30 seconds OEI and 30 minutes OEI indicate the total number of times spent in one or some of these exceedance areas which may occur during a mission or flight. An excursion into one or some of these areas occurs when one or some of these thresholds, defined in FIG. 7, is exceeded during one or some of these exceedance conditions. The Data Collection Unit (DCU) stores the time spent in the exceedance area. The DCU stores the time the engine left the exceedance. The EEC calculates the percentage of wear of critical engine parts by using the time spent at contingency power.

The rapid take-off cycle factor (RTCF) occurs when an engine shut-down at the point in time T2 is followed by an engine start before the point in time T1. As shown in the table in FIG. 3, T2 is defined as zero seconds and T1 is defined as 90 seconds. This means that if an engine is started-up and followed by an aircraft take-off before 90 seconds has elapsed, the RTCF factor is applied to the equation (1). The actual RTCF factors are illustrated in FIG. 3, adjacent to the preferred values for T1 and T2 which trigger the implementation of these factors. Alternatively, the RTCF factor can be implemented into equation (1) only when the sudden engine start reaches one of the threshold values (defined by X1 in FIG. 3). For example, if the engine is started and the MGT reaches Threshold Four in less than the 90 second time interval for the particular component under consideration, the RTCF factor can be applied to the equation (1). If these conditions are not met, the RTCF factor is not applied to the equation (1).

The extended cycle factor (ECF) is a constant value which is applied to equation (1). The values for ECF are defined in the table in FIG. 3.

Figure 4:
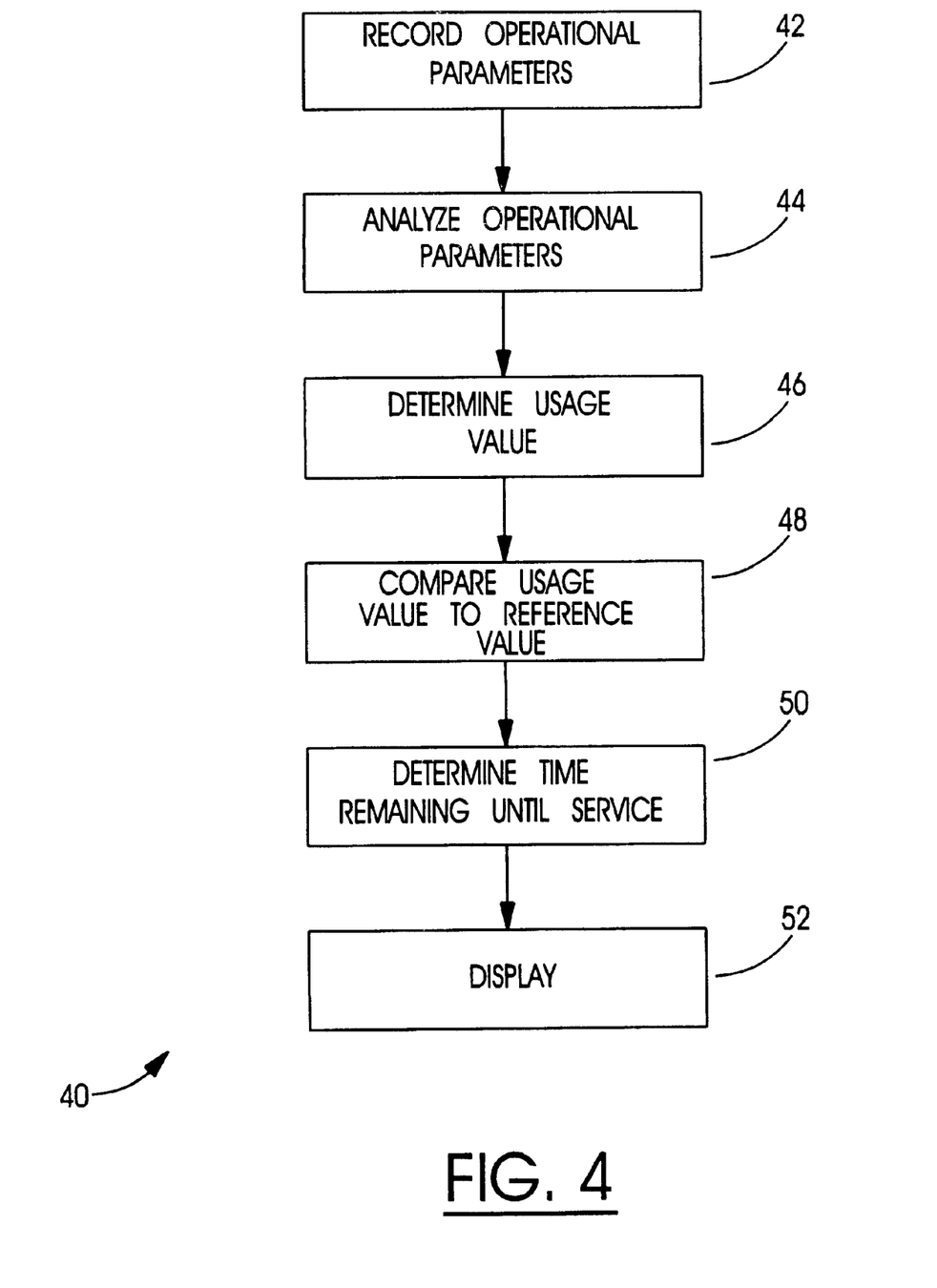
FIG. 4 provides a general logic sequence for calculating time remaining until service and displaying the resulting calculations.
Figure 5:
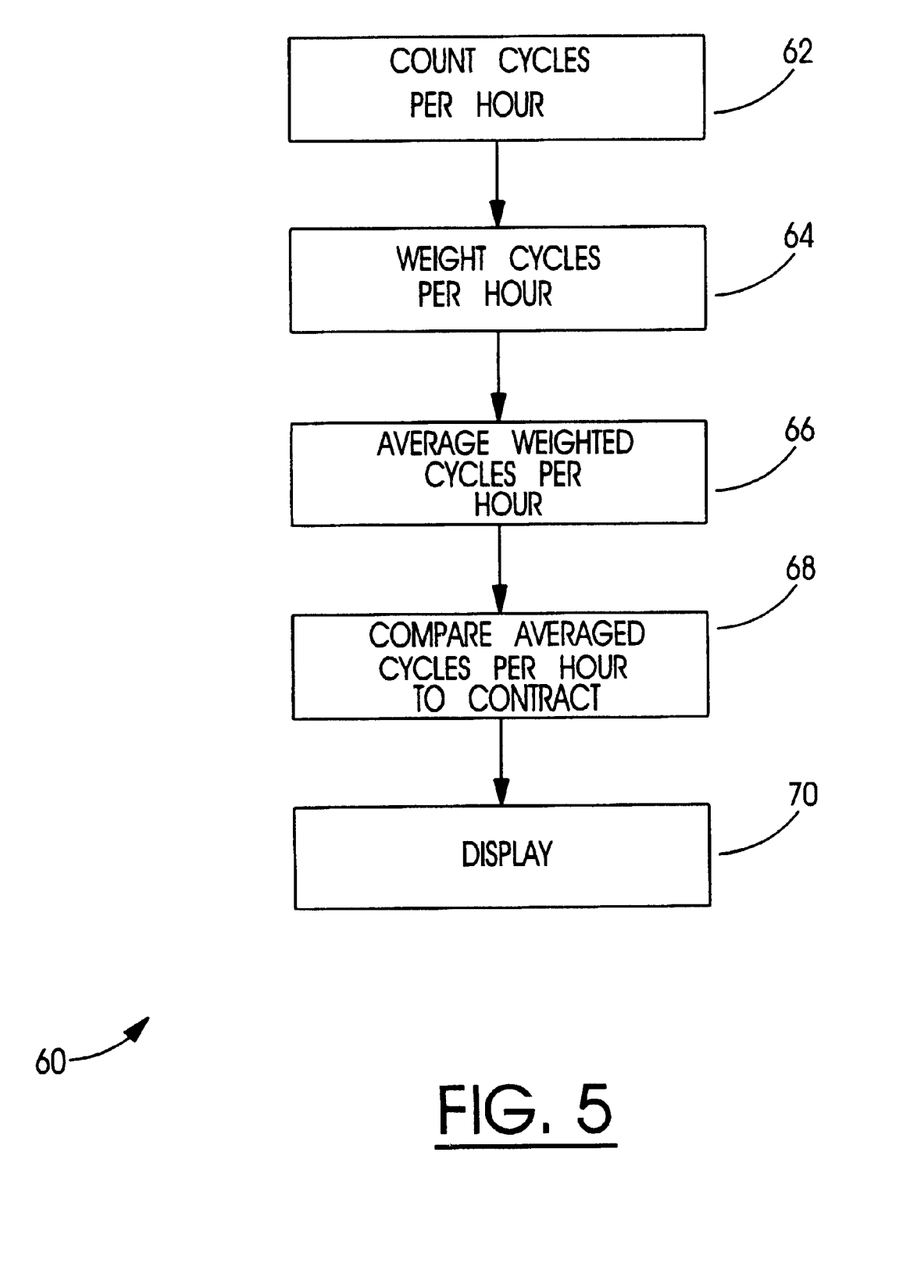
FIG. 5 provides a logic sequence for calculating weighted and averaged cycles per mission and displaying the resulting calculations.
Figure 6:
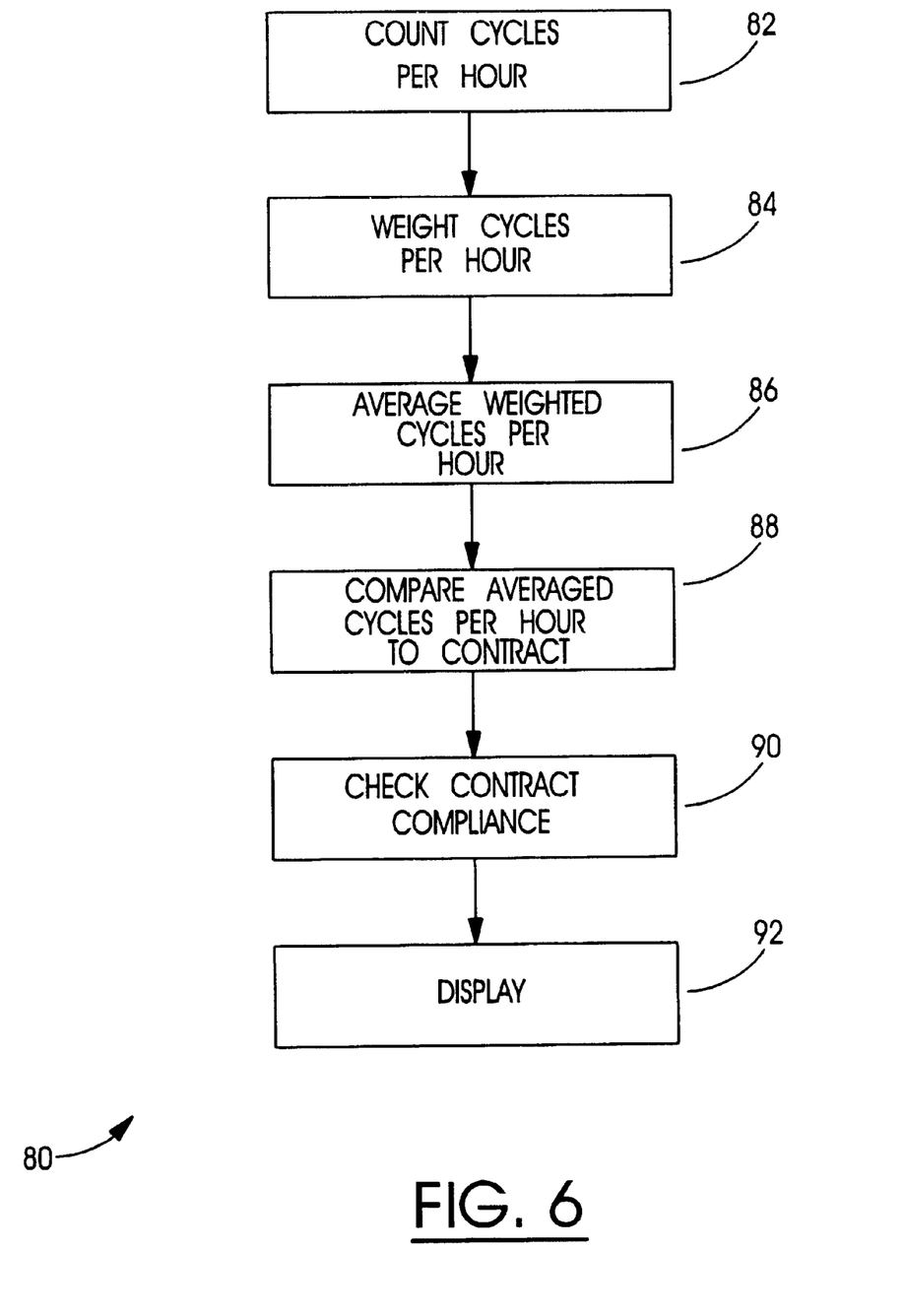
FIG. 6 provides a logic sequence for calculating weighted and averaged cycles per mission for the purpose of checking warranty compliance and displaying the results.

In order to calculate the date of a predicted maintenance event, weighted and averaged cycles per hour, and the information necessary to operate the display system in FIG. 2, reference is made to the logic diagrams in FIGS. 4 to 6, illustrating the steps necessary to perform the appropriate calculations.

FIG. 4 illustrates the steps necessary to perform calculations of remaining time until service. The actual service may be an HSI or overhaul, and the flow chart generally illustrates the steps necessary to calculate the time remaining until these engine maintenance services are required. Step 42 involves a processing system on board the aircraft recording in flight operational parameters pertaining to the engine. These parameters are typically the maximum temperature reached by the gas generator and power turbine during a mission, and the maximum rotational velocity of the gas generator and power turbine during a mission. Also recorded are the number of engine cycles for each mission, the total number of missions, and the total hours in operation since the last engine service. Other relevant information may be recorded, as would known and appreciated by the person skilled in the art. This information is recorded in a memory in the on board processing system, and can be transferred to a ground based processing system when convenient.

The ground based processing system is configured to analyze the operational parameters, as shown in step 44. This analysis will take the operational parameters which have been recorded and determine a usage value at step 46. The usage value is a figure which reflects the degree of exposure to physical stress that the engine or components in the engine experience during a mission. The usage value is then compared to a reference usage value at step 48 to determine if any alarms should be triggered to warn the system user of any overuse of the engine during a mission. The usage value is also used as a factor which influences the remaining time until service. If the usage value indicates excessive stress on the engine, the usage value can be used to reduce the time remaining until an appropriate engine service must be made under the maintenance plan, or even for engine warranty compliance. Conversely, if the usage value indicates lower degrees of stress on the engine, the usage value will increase the time remaining until the appropriate engine service. Any usage alarms which are triggered and the adjusted remaining time until service are displayed in a graphical display system, as illustrated in FIG. 2.

The usage value, as set forth in step 46, is defined as a value of weighted cycles per hour for the entire engine.

The system also analyzes the CT, PT and IMP component usage. This usage value can serve as the basis for determining the time remaining until service of an individual component. In addition, the ground based processing system calculates an adjusted remaining time until service at step 50 by applying the usage value to the remaining time until service, known from the flight hours since last service. If the usage value increases, the inverse usage value can be multiplied by the remaining time until service to obtain the adjusted time remaining until service. If the usage value decreases, the usage value can be multiplied directly by the time remaining until service to the adjusted time remaining until service. Alternatively, the engine usage value can be compared to look up tables to determine compliance with a maintenance plan rate per hour. The adjusted time remaining until service more accurately predicts the time remaining until service that is required for the particular engine component.

If the usage value is to be a weighted cycles per hour for the entire engine, the ground based processing system compares the operational parameters recorded to the tables shown in FIGS. 3–3A to obtain variables for each of the equations (1)–(3). The processing system then calculates the weighted cycles per hour for each of the CT, PT and IMP and produces an overall average of the three values to obtain a usage value reflecting the overall usage of the engine. This value can then be compared to a reference usage value at step 48 to determine whether to trigger a warning of excessive engine stress. The ground based processing system will also calculate an adjusted remaining time until service at step 50 by applying the usage value to the remaining time in service as described previously.

FIG. 5 illustrates an algorithm for calculating a weighted value of cycles per hour for an individual engine. This algorithm may be used by the processing system to produce the displayed value of cycles per hour for each engine, as shown in the graphical display system of FIG. 2.

The operational parameters recorded by the processing system on board the aircraft include a record of the value for engine cycles for the last mission, which is a raw value that is not adjusted in light of the other engine operational parameters. When the operational parameters are downloaded to the ground based processing system, the ground based processing system records the counted cycles for the last mission at step 62. The counted cycles for the last mission are then applied as the FCF (flight cycle factor) value for equation (1). The recorded operational parameters are then used to look up the appropriate values for variables in the equation, and the equation is then used to calculate the weighted cycles per hour for each of the CT, PT and IMP, as illustrated at step 64. The weighted cycles per mission for each of the CT, PT and IMP may then be individually displayed for each engine, or averaged together at step 66 to form a single figure which represents the weighted cycles per mission for the engine. The averaged cycles per mission may then be compared to a standard to determine if any warnings are to be triggered, as shown in step 68. The averaged cycles per mission and any relevant warnings are then displayed to the user at step 70. The warnings may be any one of a variety of warnings, including: (1) A warning that a particular engine being overstressed; (2) A waning that the engines are being unevenly stressed; (3) A warning that certain engines are in need of immediate service or inspection; (4) A warning on non-compliance with an engine warranty. These warnings may be used by the aircraft maintenance manager to rotate aircraft in the fleet to even the usage of the engines, or may result in instructions to pilots to control over-throttling on certain aircraft. The warnings also serve to help schedule engine maintenance, since the aircraft maintenance manager can see which aircraft require immediate maintenance, based on the presence of warnings.

The step of comparing the averaged cycles per hour to a standard is useful for the purpose of determining compliance with a maintenance plan provided by an engine maintenance service provider, and for providing reports necessary for certifying compliance with a warranty. This is illustrated in the algorithm of FIG. 6, where steps 82–88 are analogous to steps 62–68 of FIG. 5. However, in the algorithm of FIG. 6, the step of comparing the averaged cycles per hour to a standard at step 88 is also followed by a compliance check at step 90. If the averaged cycles per hour exceeds the standard, or alternatively, exceeds the standard by a predetermined amount, the processing system will make a determination that the engine is not compliant. If the averaged cycles per hour does not exceed the standard, or exceeds the standard by a small margin, then the processing system will make the determination that the engine has been operated within warranty.

Since the maintenance plan compliance check is dependent upon the calculated average cycles per hour, the engine maintenance plan is applied more fairly to the engine users. Fleets exposed to high degrees of engine stress may be penalized with plan non-compliance, and thus will be required to bear greater costs for engine repairs and servicings. Those fleets exposed to lower degrees of stress who remain compliant will be rewarded with lower costs repairs and service.

It will be appreciated that the present invention has been described hereinabove with reference to a preferred embodiment in the context of aircraft turbine engines, and that the invention is not limited to this specific preferred context.

What is claimed is:

1. An aircraft maintenance monitoring display system comprising:

a data storage containing values representing:

at least two aircraft engine current usage parameters;

at least two aircraft engine maximum recommended usage until scheduled maintenance parameters; and         at least two predicted aircraft engine usage parameters corresponding to an amount of aircraft engine usage by a time of scheduled maintenance;

a usage estimation calculator receiving a plurality of variable engine usage parameters from at least one aircraft flight recorder and generating as a first output said aircraft engine current usage parameters and as a second output said predicted aircraft engine usage parameters; and     a graphic display device providing a visual display of said at least two current usage parameters, said at least two maximum recommended usage parameters, and said at least two predicted usage parameters, wherein said visual display allows for comparison of engine usage between at least one of: engine components in a same engine; engines on a same aircraft; and aircraft within a same fleet.

2. The apparatus as claimed in claim 1, wherein said at least two engine components are selected from the group consisting of: a compressor turbine, a power turbine, and an airflow impeller.

3. The apparatus as claimed in claim 1, wherein said maximum recommended usage parameter represents a hot section inspection.

4. The apparatus as claimed in claim 1, wherein said maximum recommended usage parameter represents an overhaul.

5. The apparatus as claimed in claim 1, wherein said engine usage parameters comprise both engine speed and temperature.

6. A method of monitoring operation of at least one aircraft engine, comprising the steps of:

establishing parameter values for maximum recommended usage until scheduled maintenance for at least two aircraft components;

monitoring operational parameters for said aircraft components during use and recording a plurality of variable engine usage parameters;

analyzing said plurality of variable engine usage parameters to determine current engine usage parameters for said at least two aircraft components and to predict when said scheduled maintenance should be performed;

providing a visual display of said at least two current usage parameters, said at least two maximum recommended usage parameters, and said at least two predicted usage parameters; and using said display to compare engine usage between at least one of: engine components in a same engine; engines on a same aircraft; and aircraft within a same fleet.

7. The method as claimed in claim 6, wherein said at least two engine components are selected from the group consisting of: a compressor turbine, a power turbine, and an airflow impeller.

8. The method as claimed in claim 6, wherein said maximum recommended usage parameter represents a hot section inspection.

9. The method as claimed in claim 6, wherein said maximum recommended usage parameter represents an overhaul.

10. The method as claimed in claim 6, wherein said engine usage parameters comprise both engine speed and temperature.

11. A method of monitoring operation of at least one engine, comprising the steps of:

establishing a time schedule of planned maintenance activities for said engine based on an expected use of said engine;

monitoring operational parameters for at least two said aircraft components during use and recording a plurality of variable engine usage parameters;

analyzing said plurality of variable engine usage parameters to determine current engine usage parameters for said at least two aircraft components and to predict when said scheduled maintenance should be performed;

providing an indication of whether a usage of said engine necessitates maintenance ahead of schedule, wherein said step of providing an indication comprises:

establishing parameter values for maximum recommended usage until scheduled maintenance for at least two aircraft components; and providing a visual display of said at least two current usage parameters, said at least two maximum recommended usage parameters, and said at least two predicted usage parameters; and using said display to compare engine usage between at least one of: engine components in a same engine; engines on a same aircraft; and aircraft within a same fleet, whereby by providing an indication as to whether actual operation of the engine over time is compliant with a maintenance plan, an engine operator manages engine operation accordingly.

12. The method as claimed in claim 11, further comprising:

setting a schedule of charges corresponding to the time schedule of planned maintenance activities; and adjusting, if necessary, the schedule of charges if the usage of the engine necessitates maintenance ahead of schedule.

13. The method as claimed in claim 11, wherein said indication comprises a predicted date and a planned date for said planned maintenance activities.

14. The method as claimed in claim 12, wherein said indication comprises a predicted date and a planned date for said planned maintenance activities.

15. The method as claimed in claim 11, wherein said analyzing comprises:

determining an engine usage value and an engine usage rate value for at least two components of said engine; and comparing said engine usage value and said engine usage rate value with reference values to predict a time when service of said at least two engine components will be required.

16. A method for managing usage of an aircraft in a fleet of aircraft, comprising the steps of:

establishing parameter values for maximum recommended usage until scheduled maintenance for at least two aircraft components;

monitoring operational parameters for said aircraft components during use and recording a plurality of variable engine usage parameters;

analyzing said plurality of variable engine usage parameters to determine current engine usage parameters for said at least two aircraft components and to predict when said scheduled maintenance should be performed;

providing a visual display of said at least two current usage parameters, said at least two maximum recommended usage parameters, and said at least two predicted usage parameters;

using said display to compare engine usage between at least one of: engine components in a same engine; engines on a same aircraft; and aircraft within a same fleet; and managing aircraft usage based on said comparing in the previous step.

17. The method as claimed in claim 16, wherein said step of managing aircraft usage comprises the step of selectively rotating usage of said aircraft.

18. The method as claimed in claim 16, wherein said aircraft is a multi-engine aircraft, and said step of managing aircraft usage comprises the step of selectively rotating an engine starting sequence for said multi-engine aircraft.

19. The method as claimed in claim 16, wherein the step of managing aircraft usage comprises the step of selectively rotating pilots flying said aircraft.

* * * * *